(12) United States Patent
Beaman et al.

(10) Patent No.: US 11,331,601 B2
(45) Date of Patent: May 17, 2022

(54) CLARIFIER WITH SUBMERGED EFFLUENT LAUNDER AND LAUNDER SWEEPER SYSTEM

(71) Applicants: Ovivo Inc., Montreal (CA); Tyson Beaman, Murray, UT (US); Garret Beaman, Salt Lake City, UT (US); Ryan Clark, Lehi, UT (US); John Vorwaller, Salt Lake City, UT (US); Robert E. Hanford, West Jordan, UT (US)

(72) Inventors: Tyson Beaman, Murray, UT (US); Garret Beaman, Salt Lake City, UT (US); Ryan Clark, Lehi, UT (US); John Vorwaller, Salt Lake City, UT (US); Robert E. Hanford, West Jordan, UT (US)

(73) Assignee: Ovivo Inc., Montreal (CA)

( * ) Notice: Subject to any disclaimer, the term of this patent is extended or adjusted under 35 U.S.C. 154(b) by 0 days.

(21) Appl. No.: 17/267,444

(22) PCT Filed: Jul. 19, 2019

(86) PCT No.: PCT/US2019/042659
§ 371 (c)(1),
(2) Date: Feb. 9, 2021

(87) PCT Pub. No.: WO2020/033126
PCT Pub. Date: Feb. 13, 2020

(65) Prior Publication Data
US 2021/0331091 A1 Oct. 28, 2021

Related U.S. Application Data

(60) Provisional application No. 62/717,655, filed on Aug. 10, 2018, provisional application No. 62/736,977, filed on Sep. 26, 2018.

(51) Int. Cl.
*B01D 21/18* (2006.01)
*B01D 21/24* (2006.01)
*B01D 21/00* (2006.01)

(52) U.S. Cl.
CPC ....... *B01D 21/186* (2013.01); *B01D 21/0006* (2013.01); *B01D 21/0042* (2013.01); *B01D 21/2438* (2013.01); *B01D 21/2444* (2013.01)

(58) Field of Classification Search
CPC B01D 21/0006; B01D 21/0042; B01D 21/06; B01D 21/186; B01D 21/2438; B01D 21/2444
(Continued)

(56) References Cited

U.S. PATENT DOCUMENTS 4,830,748 A * 5/1989 Hall ................. B01D 21/0006
210/525
4,876,010 A * 10/1989 Riddle ............. B01D 21/0006
210/525
(Continued)

FOREIGN PATENT DOCUMENTS

DE 4337652 * 4/1995

*Primary Examiner* — Christopher Upton
(74) *Attorney, Agent, or Firm* — Thomas M. Freiburger (57) ABSTRACT

In a wastewater treatment system, a clarifier has a submerged effluent launder, with a sloped, submerged plate that allows clarified liquid to exit through submerged openings. The sloped surface tends to accumulate solids, which can lead to algae growth. Typical internal scum collection system equipment prevents any efficient way to clear the
(Continued)

accumulated sludge off the launder surface because of interferences. As disclosed here, a scum discharge area or box is placed external to the clarifier in one embodiment. Scum is wiped from a vertical surface of the launder assembly, above the sloped launder surface, and swept over a scum beach at one position in the clarifier, to drop into a lower trough and the flow out through the clarifier wall to a drop out box or scum discharge area. This allows for a rake-attached, sweeping launder wiper to be moved with the clarifier's rake to remove the accumulation of sludge from the launder's submerged surface, without elaborate moving parts. The sludge is swept back to settle in the clarifier, improving effluent quality by preventing sludge from exiting along with clarified water. In another embodiment the scum discharge box is internal, as a low-profile vertically disposed channel against the inside clarifier wall, leading to an existing scum pipe through the clarifier wall.

17 Claims, 11 Drawing Sheets (58) Field of Classification Search
USPC .................................. 210/525, 528, 540, 541
See application file for complete search history.

(56) References Cited

U.S. PATENT DOCUMENTS

| | | | | |
|---|---|---|---|---|
| 4,978,447 | A * | 12/1990 | Hall | B01D 21/0006 210/541 |
| 5,250,178 | A * | 10/1993 | Casper | B01D 21/04 210/525 |
| 5,269,928 | A | 12/1993 | Leikam | |
| 5,720,890 | A * | 2/1998 | Caliva | B01D 21/0006 210/528 |
| 6,016,924 | A * | 1/2000 | Caliva | B01D 21/0006 210/528 |
| 6,022,475 | A * | 2/2000 | Thomas, III | B01D 21/0006 210/528 |
| 7,722,776 | B2 * | 5/2010 | Essemiani | B01D 21/0042 210/528 |
| 7,971,731 | B2 * | 7/2011 | Schaller | B01D 21/0042 210/528 |
| 8,225,943 | B2 * | 7/2012 | Kershner | B01D 21/0006 210/528 |
| 8,499,405 | B1 | 8/2013 | Ristau et al. | |
| 9,919,244 | B2 | 3/2018 | Heimdal et al. | |
| 2007/0056134 | A1 * | 3/2007 | Sheker | B01D 21/0006 15/246.5 |
| 2017/0333813 | A1 | 11/2017 | Haggard et al. | |

* cited by examiner

CLARIFIER WITH SUBMERGED EFFLUENT LAUNDER AND LAUNDER SWEEPER SYSTEM

This invention claims benefit of provisional application Ser. No. 62/717,655, filed Aug. 10, 2018, and 62/736,977, filed Sep. 26, 2018.

BACKGROUND OF THE INVENTION

This invention concerns wastewater treatment, and particularly the launder and scum management in a clarifier, on the liquid side of a treatment plant.

In U.S. Pat. No. 9,919,244, an embodiment of a submerged effluent launder (SEL) is described, mounted on the internal wall of a clarifier and comprising an enclosure that receives liquid effluent of the clarifier, through submerged openings in a downwardly/inwardly sloping top plate. A scum surface is provided by a vertical upper wall of the structure, at the upper end of the sloped plate. At the lower end of the sloped plate extends a density current baffle, which can be an overhanging extension of the sloped plate.

As in any launder with an adjacent density current baffle, there is a tendency for a small portion of the circulating sludge in the clarifier to escape and bypass the density current baffle, moving up and potentially being discharged with clarified liquid. In the case of the SEL with the sloped top plate, much of the bypassed solids settles onto the surface of the sloped plate. This can cause a problem of algae growth, and also, the solids settled onto the upper launder surface could potentially be removed, to allow a better clarifier effluent.

If a scum box or collection trough is located within the clarifier at a selected location adjacent to the scum surface, as is typical in clarifiers, no practical and efficient way to clean the sloped launder surface is available. The scum collection trough or box and associated piping and supports will interfere. To overcome this, a complex system of moving parts would be required, such as counterweights or a spring system. These moving parts can become hung up on traditional scum box designs and can damage rake arms, cage and drive, which can be costly.

There is a need for a scum removal arrangement and method that will allow efficient cleaning of the sloped launder surface in such a submerged effluent launder (SEL), without requiring an added system of moving parts.

SUMMARY OF THE INVENTION

This invention provides a solution to the problem described above, for a clarifier with a submerged effluent launder having a sloped, submerged upper plate that allows clarified liquid to exit through submerged openings. With the invention, the scum drop out box or discharge device can be placed external to the clarifier, removing not only the scum box but also piping and supports from inside the clarifier. Scum is wiped from a vertical surface of the launder assembly, above the sloped launder surface, at the liquid surface level, and swept into a flat, cantilevered, low-profile, gently sloped scum ramp at one position in the circumference of the clarifier. The scum drops into a drop channel and flows out through a break in the clarifier wall to the external scum discharge area. This allows for a rake-attached, sweeping launder wiper to be moved with the clarifier's rake to remove the accumulation of sludge from the launder's submerged surface without requiring further moving parts. The sludge is swept back to settle in the clarifier, as a second phase of settling. Clarifier effluent quality is improved, and sludge is substantially prevented from exiting along with the clarified water. Also, maintaining the upper panel, i.e. the sloped surface, clean minimizes or prevents algae growth.

With the system of the invention, no external supports are needed, since the external scum drop out box preferably is connected directly to the outside of the clarifier wall, without interconnection piping.

In another embodiment of the invention, the scum drop out box is not positioned externally on the clarifier wall, but rather it extends down the interior wall, in a configuration to allow a very low profile against the clarifier wall. The scum ramp or trough described above is essentially the same, but the scum collected in the scum drop channel drops into the low-profile scum drop out box extending down the internal clarifier wall, to a position where it is open to an existing scum pipe that extends horizontally out through the wall. That scum pipe was previously a part of a typical internal scum box with internal piping and supports, but has been cut off at the interior surface of the wall.

This embodiment requires that the low profile, vertically oriented scum drop out box pass vertically down through the SEL. The scum is contained within the scum box and isolated from the interior of the SEL, the pass-through opening in the SEL being sealed at interfaces. This second embodiment avoids the need to cut a notch or break out the clarifier wall, at or near the top. The rake-attached, sweeping launder wiper is permitted to pass by the vertical, low-profile scum box, since the steel mounting for the rubber wiper blade does not extend to a point of interference with the scum box. The rubber wiper extends out a greater length, and its flexibility allows it to deflect and pass by when it contacts the scum box.

These and other objects, advantages and features of the invention will be apparent from the following description of a preferred embodiment, considered along with the accompanying drawings.

DESCRIPTION OF PREFERRED EMBODIMENTS

Figure 7:
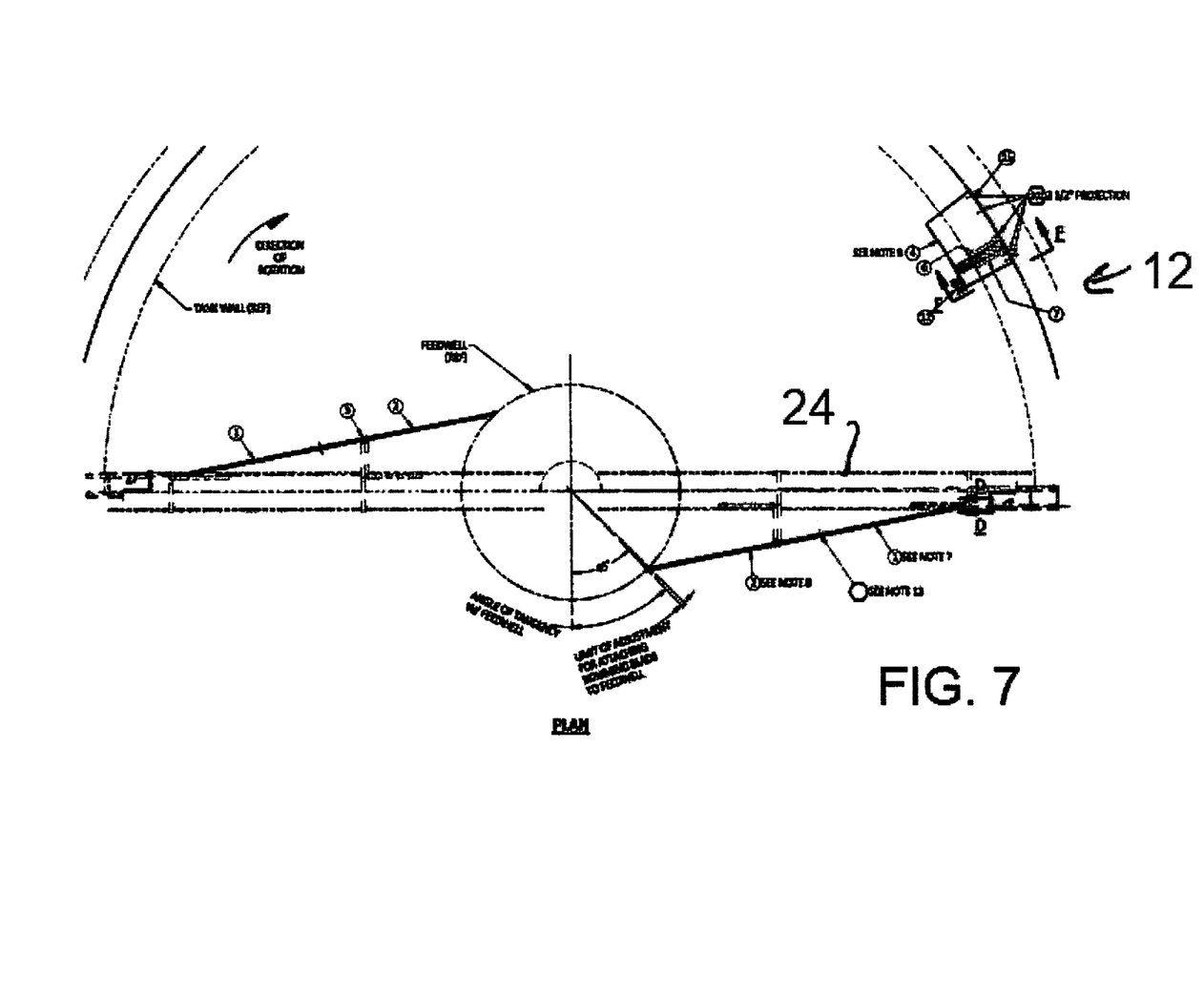
FIG. 7 is an overall plan view showing an example of a clarifier with the system of the invention.

In the drawings, FIGS. 1-4 show an embodiment of the system of the invention, in connection with a wall 10 of a clarifier 12 (clarifier shown in FIG. 7). A small section of the wall 10 is seen in FIGS. 1-4.

A submerged effluent launder (SEL) is shown, as a fragmented section, at 14 in this preferred embodiment. This is essentially as in an embodiment of U.S. Pat. No. 9,919, 244, a generally triangular cross-sectional shape with an upper side which is a sloped, submerged plate 16 which has submerged effluent holes (not shown) through which clarified liquid enters the launder for discharge from the clarifier.

A scum accumulating surface is at 18, a vertical surface at the top of the sloped plate 16, preferably an upper extension integral with the plate 16. The scum is wiped from the scum surface 18 by a skimmer or wiper blade 20 (essentially a squeegee) that has wipers on the end contacting the scum surface 18 as well as along its bottom. The end wiper brings scum to a flat, sloped trough or ramp shown at 22 that acts as a scum beach. When the skimmer 20, which advances around the clarifier wall by connection to a rake arm (24, see FIG. 7) via a skimmer arm 26, reaches the beach or ramp 22, it pushes collected scum up the slope of the beach, causing the scum to fall down into a lower channel or drop channel or trough 28, as the skimmer 20 slides over guides 29 to traverse the gap. The lower trough or drop channel, with some flush water, directs the scum into an external drop out box 30 for discharge from the clarifier. An opening 31 through the clarifier wall, which could be a notch or a hole, is provided for this purpose. Discharge is via an exit pipe 32; an optional overflow fail safe pipe is shown at 34 for effluent overflow. Note that the skimmer 20 must swing upwardly as it moves up the scum beach, and thus it is supported on swing arms 21 that are connected to a pivot rod 21a.

The external drop out box and the shallow, low-profile trough 22 leave a clear path below for an SEL plate wiping system of the invention. This path around the circumference of the clarifier wall is used by SEL wiping equipment 36 to clean the SEL's sloped surface 16, sweeping along this path along with the scum skimmer 20, both attached to the rake arm. A structural member indicated at 37 extends up from the rake arm to support both the plate cleaner and the scum skimmer.

A preferred form of SEL plate wiping device is illustrated as a structural triangle 38, at the outer end of which is connected a squeegee-type wiper blade 40 (which could be a brush or other material) that may be angled as shown so that the wiped solids are wiped down along the plate 16, including a plate tail extension 16a serving as a density current baffle. The solids are thus dropped back down to settle in the clarifier, in a second phase of settling. The wiper blade 40 may be non-angled, aligned with the support structure 36, if desired.

Figure 1:
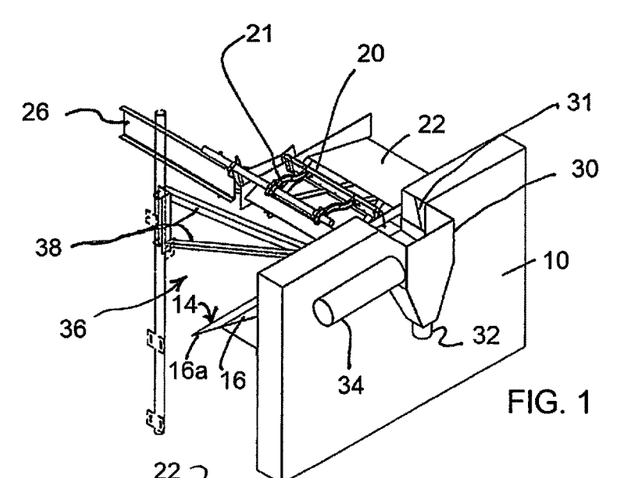
FIGS. 1 through 4 are somewhat schematic views in perspective, showing a portion of a submerged effluent launder on a section of a clarifier wall, and indicating a scum collection and discharge system and a cooperating SEL surface cleaning system of the invention.
Figure 2:
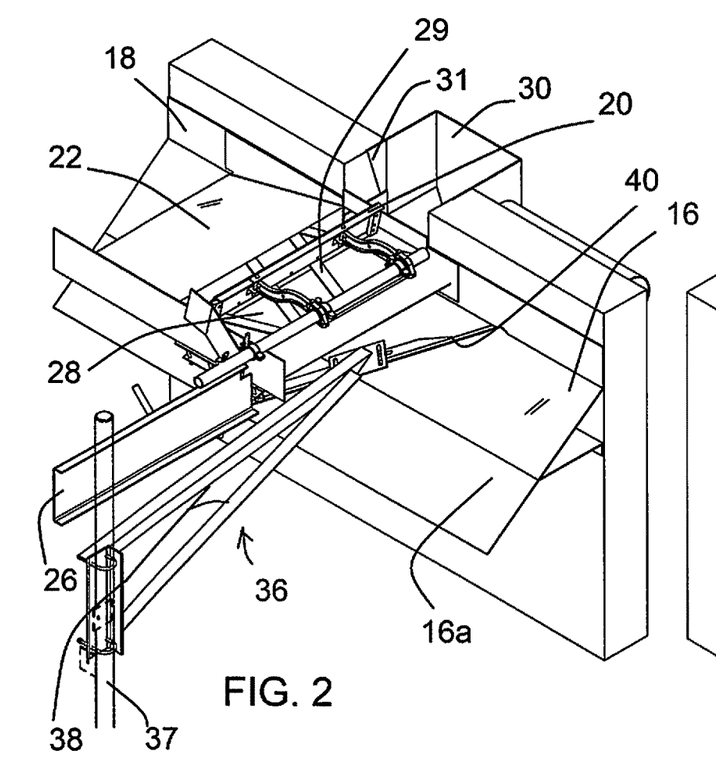
Figure 2A:
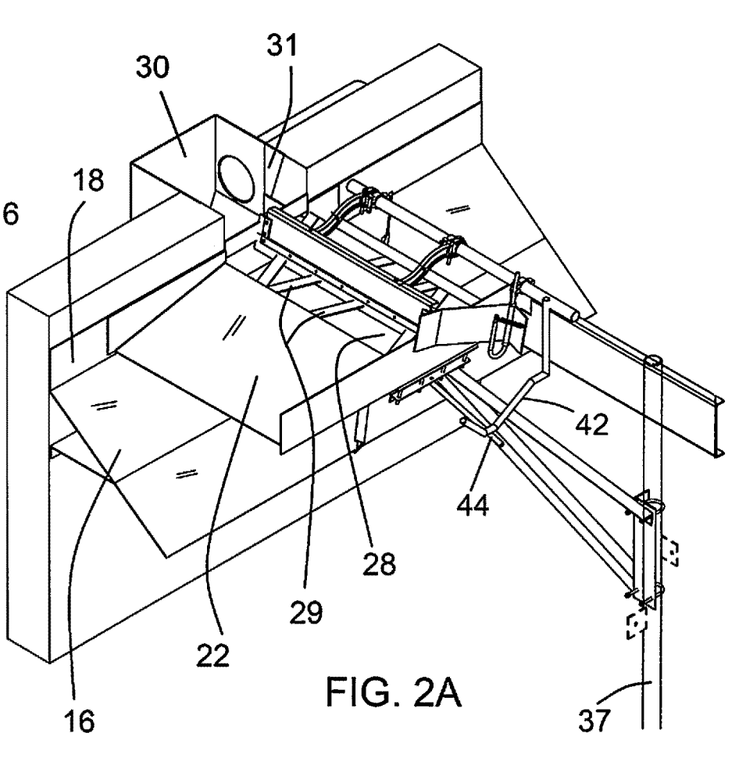
Figure 3:
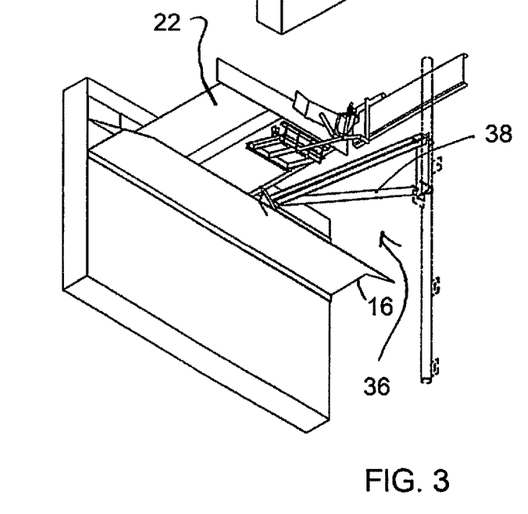
Figure 4:
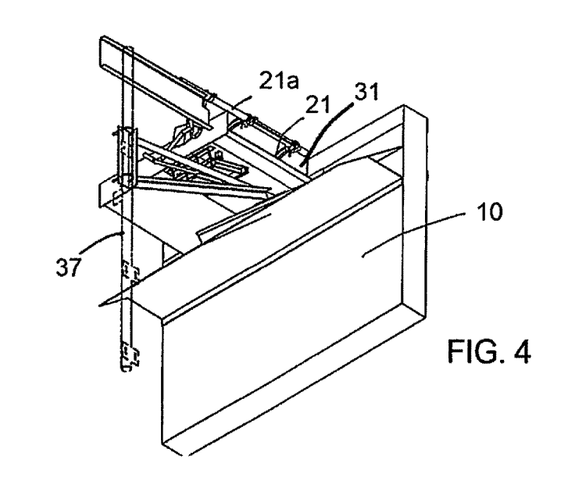
Figure 5:
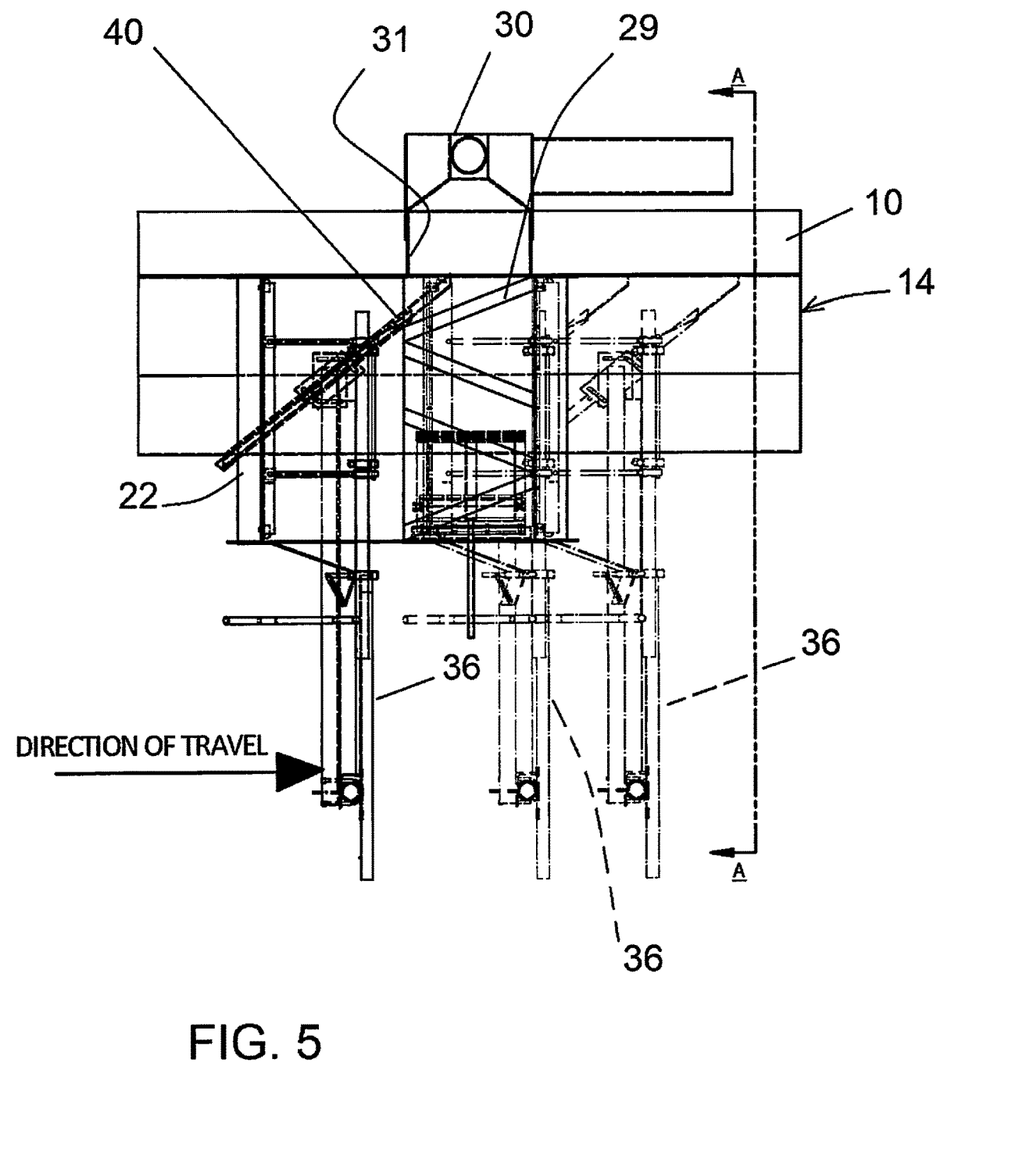
FIGS. 5 and 6 are plan and sectional elevation views showing the invention.
Figure 6:
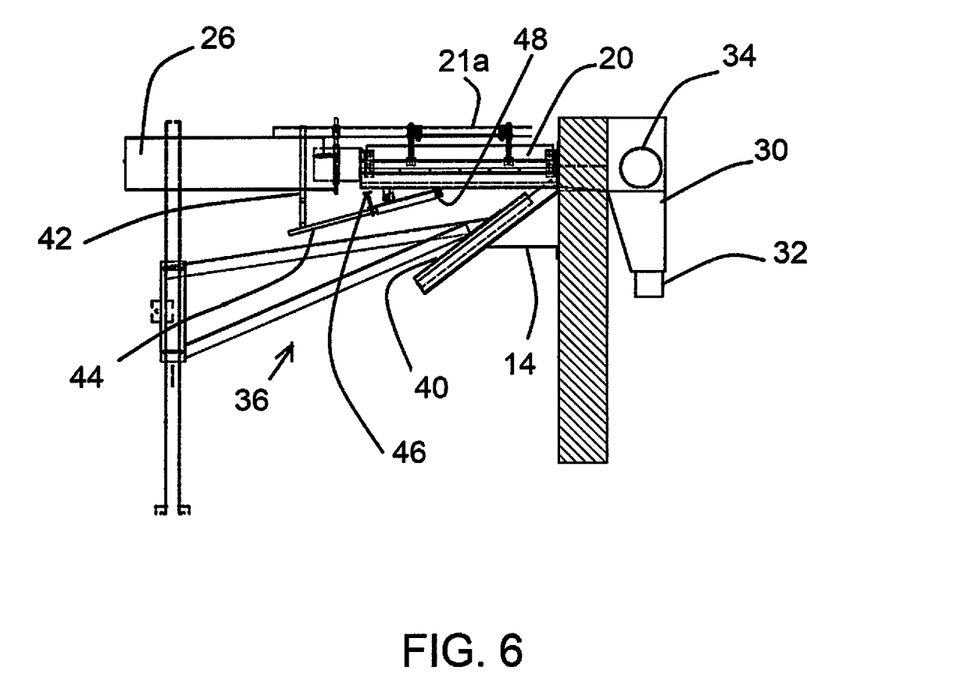

FIGS. 5 and 6 show the apparatus of the invention in plan and sectional elevation views, each showing portions of the clarifier. The SEL 14 is below the scum removal apparatus, and the wiper 40 that cleans the inclined plate upper side is seen at the left, moving to the right with the rake arm, as indicated by additional images of the moving equipment shown in dashed lines. The scum drop out box 30 is seen outside the clarifier wall 10, receiving skimmed scum via the sloped beach 22 (which is not continuous as is the SEL) and the lower trough 28, through the break 31 in the wall 10.

FIG. 6 shows the apparatus with the scum skimmer 20 approximately at the top of the sloped scum beach or over the lower trough or drop channel 28. At this position the lower trough is being flushed with clarifier water, to enable the collected scum to flow out into the external drop out box 30. A flush arm 42 secured to the moving mechanism and advancing with the skimmer (and with the rake arm) engages and pivots down a flush rod 44 that opens a valve 46, causing clarifier water to flow up into the lower trough to flush the channel. As shown in the perspective drawings, particularly in FIGS. 2, 2A, 3 and 4, the flush arm releases the flush valve rod 44 as the skimmer 20 passes the lower trough 28. The valve closes due to a counterweight 48 at an opposite end of the rod 44, beyond a pivot point.

FIGS. 8 through 11 illustrate a second embodiment of the invention, in which the drop out box is not placed on the external side of the clarifier, but rather within the clarifier, in a low-profile configuration extending vertically down the internal clarifier wall, in a manner that still allows the SEL wiper 40, driven by the rake arm, to operate in cleaning the upper surface of the SEL.

Figure 8:
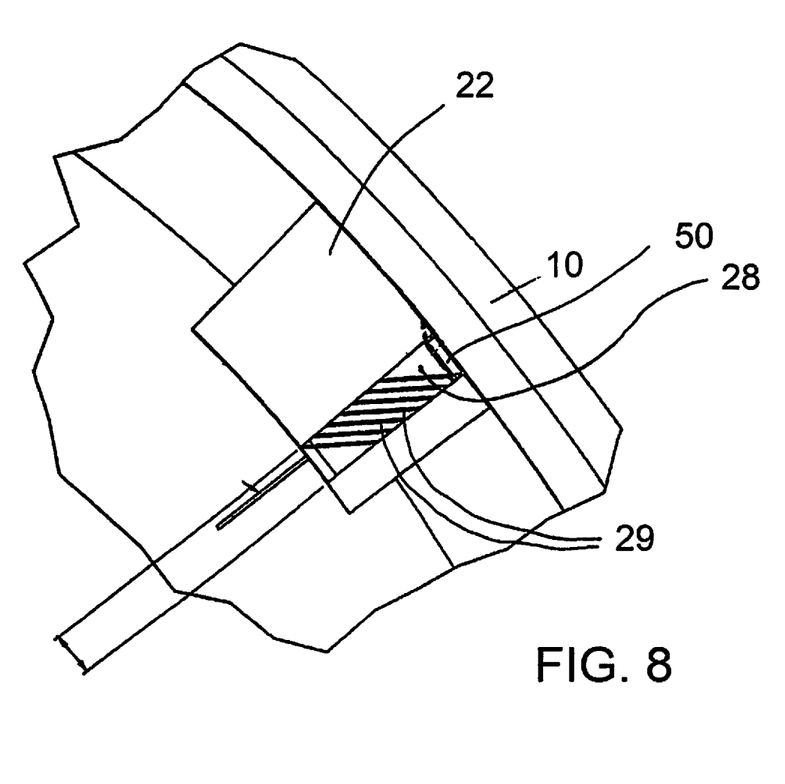
FIG. 8 is a partial plan view showing a portion of the circumference of the clarifier and showing components of the invention, according to a second embodiment.

FIG. 8 shows a scum or ramp beach 22 which can be similar to that shown in the above described embodiment. The scum ramp or beach, which has a slight uphill slope, is swept when the rake arm comes around and moves the scum skimmer 20 along and up that beach. However, in this variation, the clarifier wall 10 is not penetrated with any notch or hole. No drop out box is attached to the outside of the wall 10. Instead, the scum, which falls from the beach or ramp 22 down into the drop channel 28 as described above, falls down into a vertically disposed, low-profile drop out box 50 that acts as a vertical conduit for the scum. As an example, the scum box/channel 50 can have dimensions of about 12 inches in width and 2½ inches in depth out from the clarifier wall, although other dimensions are possible. The top opening of the scum box/conduit 50 is flush with the bottom of the trough 28.

Figure 9:
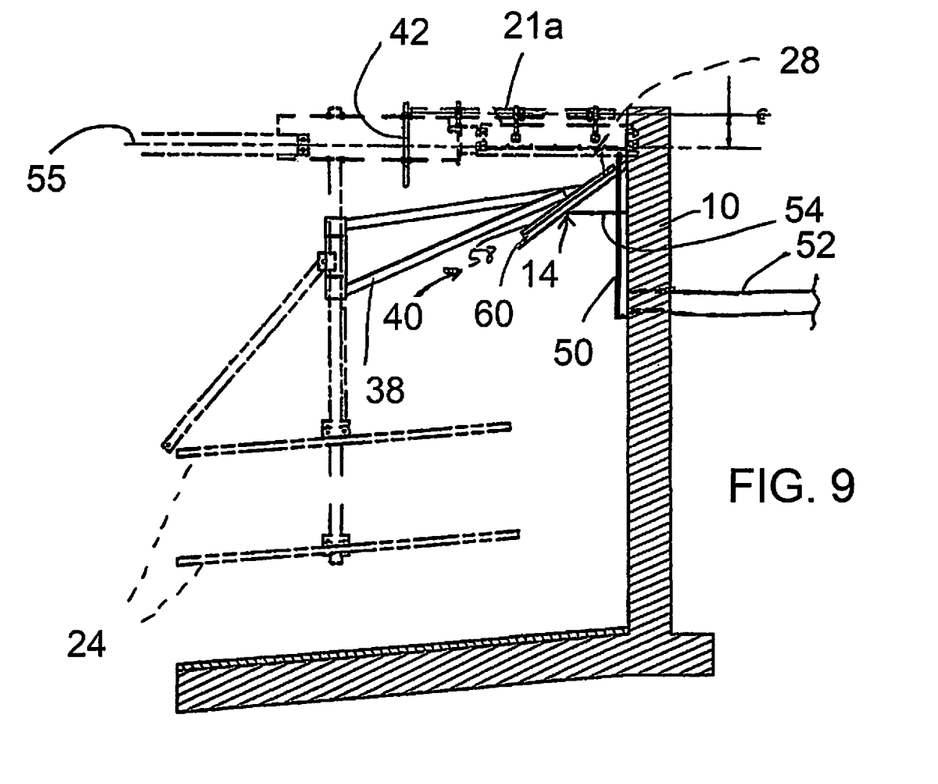
FIG. 9 is a elevation view in section, showing an outer portion of the clarifier and the second embodiment of the invention wherein the scum box is in the form of a low-profile vertically extending box against the internal clarifier wall.

FIG. 9 shows the arrangement of this second embodiment in profile, i.e. sectional elevation view as seen along a radial plane through the clarifier. A scum exit pipe 52 is already existing in most cases, since the SEL 14 has been retrofitted into a clarifier which previously had an internal, conventionally configured scum box with piping and supports. The existing pipe 52 penetrates the clarifier wall, as shown, and has been cut off at the inner side of the wall 10. FIG. 9 shows that the vertically oriented scum box/conduit 50 is arranged to lie flatly against the wall, protruding only 2½ inches out from the wall (or another selected dimension), as small as possible for reasons explained below. The scum box/conduit 50, which may be about three feet in length vertically, depending on the position of the existing pipe 52, extends down from the scum lower trough 28 and passes through the SEL 14. The SEL is provided with a rectangular hole through its upper plate and through the shelf or lower side 54 of the SEL, and the points of contact between the drop out box 50 and the SEL 14 are sealed. At the lower end, the scum box/conduit 50 is simply sealed against the clarifier wall, so that the liquid-borne scum falling to the bottom of the drop out box flows outwardly through the scum exit pipe 52.

Per the invention this arrangement does not interfere with the cleaning of the upper surface of the SEL by moving the wiper 40. The wiper is comprised of a stainless steel wiper holder 58 that, as shown in FIG. 9, extends only to a point just short of the scum box/conduit 50. The rubber or neoprene wiper blade 60 supported by the wiper holder 58 extends farther, preferably to the clarifier wall 10. When that flexible wiper blade encounters the low-profile scum drop out box/conduit 50, it simply deflects, with its outer end bending in the downstream direction. Note that for this purpose the scum box/conduit could be trapezoid-shaped to present a sloped transition to the flexible wiper blade, as indicated by the dashed line in FIG. 8.

Figure 9A:
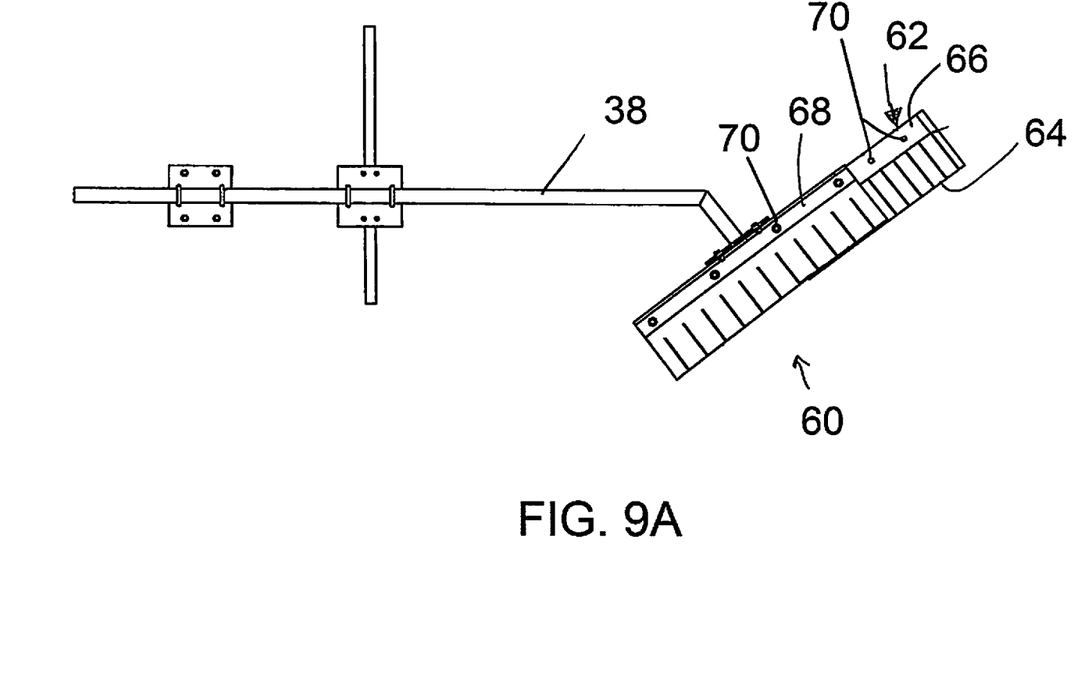
FIGS. 9A and 9B are elevation and plan views showing details of a launder sweeper in the second embodiment of the invention.
Figure 9B:
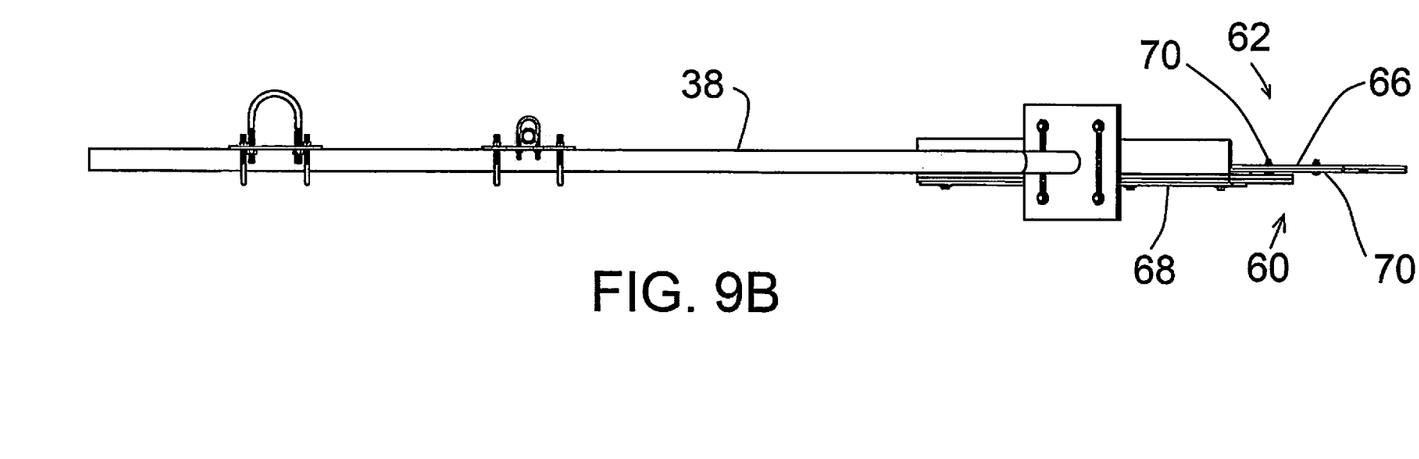

FIGS. 9A and 9B show a preferred form of sweeping launder wiper blade 60, particularly to accommodate the movement of the wiper past the scum box/conduit 50 as well as to accommodate other small obstacles and imperfections. The sweeper or wiper blade 60, which is supported on the launder wiper support 38 and driven with the rake arm as described above, must be capable of sweeping the entire top surface of the launder where settling of solids may occur. As discussed above, the scum box/conduit 50 creates a protrusion which would interfere with a rigid sweeper blade. The preferred sweeper or wiper 60 has a flexible end part or outer section 62 that will bend as it sweeps past the scum box and also engages underneath the scum beach 22, where clearance can be small. As shown in FIG. 9B, the wiper blade 60 of this embodiment preferably is aligned parallel with the support 38, i.e. lying generally in a radial plane of the circular tank.

Another benefit of the flexible end part 62 is that most clarifier tanks are not perfectly circular or concentric, so that the sweeper could be, for example, one-half inch from the clarifier wall on one side of rotation, but up to five inches or so away from the wall at the opposite position 180° removed. A neoprene or other rubbery wiper element 64, particularly at the end part 62, will accommodate that variation, allowing for bend where the wall is closer and for travel over the scum box/conduit 50 on the internal side of the clarifier wall. Since the neoprene alone lacks the strength or rigidity to hold its shape, the bendable portion 62 includes a spring stainless steel support band or bands 66 that are secured to the upper end of the neoprene wiper or wipers 64. The spring stainless steel outer bands 66 add to the neoprene the strength to bounce back and always to be touching the wall, while also providing the flexibility in the outer part 62 to account for the scum box interference and any irregularities in the tank.

FIG. 9B shows the spring stainless steel bands 66 can overlap more rigid stainless steel wiper holders 68 that retain the flexible wiping blade in the main part of the wiper/sweeper structure 60. The bands are secured together in the overlap region.

The neoprene wipers 64 include slits or cuts as shown, to allow for better bend back and overlap. This is important to assure that when the sweeper runs over bolt heads it does not cause lifting of a large portion of the neoprene, which would cause some areas of the launder surface to be missed.

In a preferred form of the sweeper, two layers of the neoprene or rubbery blade, with offset slits, are provided so as to cover more of the launder surface if some of the flexible neoprene pieces were to be spread apart. Further, the outer section 62 can include two or three layers of spring stainless steel bands, for example, one at each of the outer sides of the neoprene wipers and one between the neoprene pieces. The spring stainless steel bands act as washers for bolts or other fasteners 70 to protect the neoprene, and they also protect the neoprene from wear and tear from touching anchor bolts holding the submerged effluent launder in place, as well as the interference of the scum box/conduit 50. In addition, the multiple layers of spring stainless steel provide for only the minimum amount of bending required. By using multiple spring steel layers, the end section 62 is provided with the strength of a thicker piece of steel but with the give to bend as far as required.

The arrangement described in the second embodiment allows for efficient scum removal without interfering with the operation of the SEL wiper, and without requiring that the clarifier wall be modified with a notch or hole for scum removal.

Figure 10:
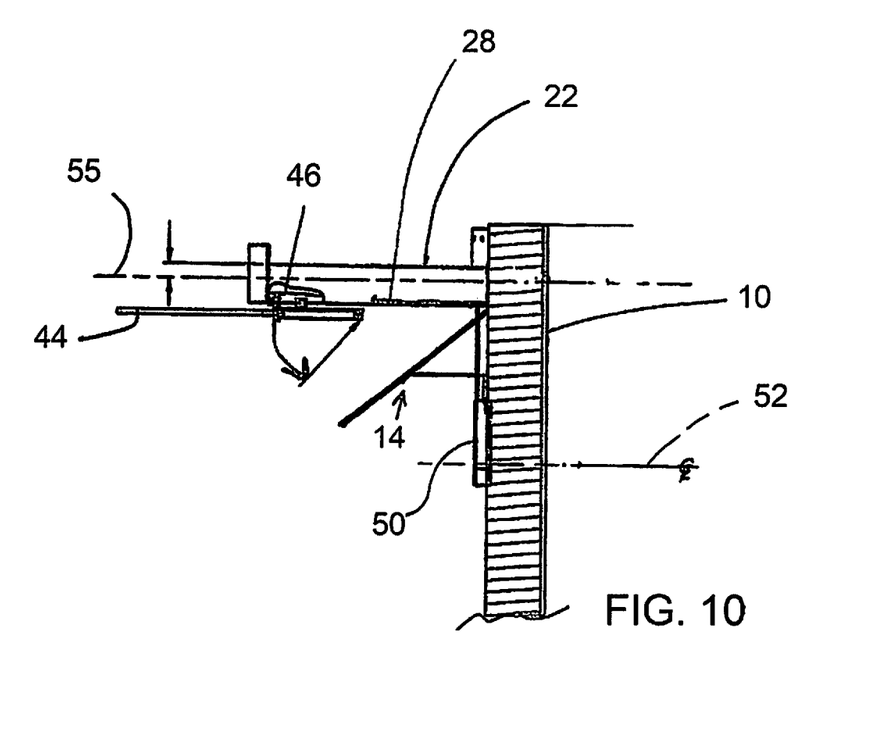
FIG. 10 is another sectional elevation view showing the second embodiment.
Figure 11:
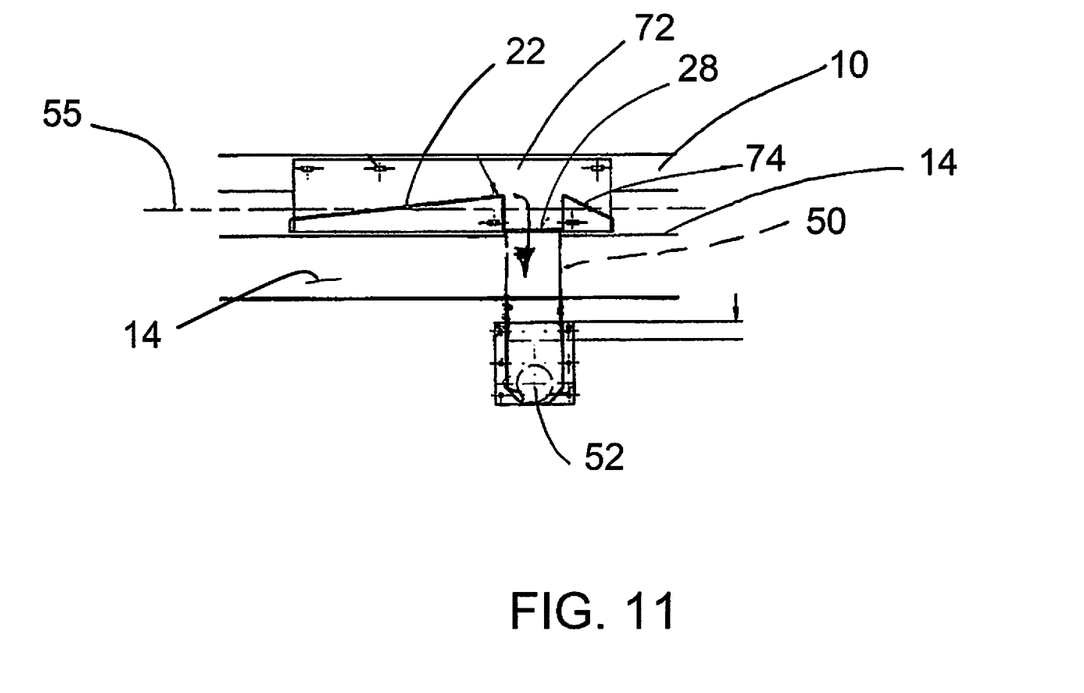
FIG. 11 is an elevation view showing a portion of the second embodiment, looking radially outwardly from inside the clarifier.

FIGS. 10 and 11 are additional views showing details of this embodiment of the invention. FIG. 10 is a view looking into the cross section of the clarifier wall 10, while FIG. 11 is an elevation view looking radially outwardly at the apparatus of the invention, from inside the clarifier. FIG. 10 shows the vertically arranged scum box/conduit 50, with the lower trough 28 shown at the top of the conduit 50, thus receiving liquid-borne scum dropping down into the conduit 50. The clarifier liquid level is shown at 55, above the level of the lower trough 28. The scum beach is seen at 22, above the liquid level. See FIGS. 1 to 4 for perspective views of these components and their relative positions. Note that the scum box/conduit 50 could be trapezoid shaped in cross section, with an angled leading edge (not seen in FIG. 10) to receive the launder sweeper 60 as it passes by the scum box.

In FIG. 10 the exit pipe 52 is represented by its center line. The drawing also shows the flush valve rod 44 and the flush valve itself 46 for admitting water up into the lower trough 28, as discussed above.

FIG. 11 shows the scum ramp or beach 22, and its relationship with the liquid level 55 in the clarifier. The scum beach is connected to a mounting plate 72 as shown, with this plate 72 secured to the interior surface of the clarifier wall 10. A down ramp 74 is seen at the downstream end of the scum drop channel (to the right in the drawing), for guiding the scum skimmer back down to a rest position after the scum skimming operation. As explained above, scum is swept up the ramp 22 and dropped down through the gap between the ramp 22 and the down ramp 74, into the drop channel 28 and then down into the rectangular/trapezoidal scum pipe/conduit 50. Also as explained above, when the scum skimmer 20 traverses the gap, it glides along guide bars 29 that leave most of the space open. The guide bars are not seen in FIG. 11.

The scum swept down into the lower trough or drop channel 28 and down through the drop out box 50 is discharged through the scum exit pipe 52, as described above.

The above described embodiments are illustrative of the manner in which the invention can be carried out. Other embodiments will be apparent to those skilled in the art and may be made without departing from the essence and spirit of the invention as defined in the following claims.

We claim:

1. A wastewater treatment clarifier having an effluent launder for withdrawal of effluent from the clarifier, comprising:

the clarifier being essentially circular and having a peripheral clarifier wall, and the launder being connected to the inside of the clarifier wall, the launder being at least partly submerged below the liquid level in the clarifier, the launder having inlet orifices submerged below the liquid level of the clarifier, the submerged launder comprising an inwardly/downwardly obliquely angled plate connected to the inside of the clarifier wall as an upper side of the launder, a shelf connected to the clarifier wall at a level below the connection of the obliquely angled plate to the wall to form a bottom of the launder, the obliquely angled plate being connected to an inward side of the shelf, and the obliquely angled plate having said inlet orifices to admit effluent water from the clarifier, the clarifier including a rake arm rotating about a center of the clarifier in a sweeping motion around the clarifier, a sweeping launder wiper having a wiper blade positioned against the obliquely angled plate and connected to the rake arm near an outer end of the rake arm so as to sweep the wiper blade along the obliquely angled plate through full circles of movement around the clarifier so as to sweep settled sludge off the obliquely angled plate so that the sludge drops to the bottom of the clarifier, a scum surface at the clarifier wall at a liquid surface level in the clarifier, above the obliquely angled plate of the launder and above the sweeping launder wiper, and scum removal equipment for removing scum from the scum surface and out of the clarifier without interfering with the movement of the sweeping launder wiper, the scum removal equipment including a scum drop out box secured at the clarifier wall, a scum wiper engaged against the scum surface and movable around the clarifier to sweep scum, and connected to the rake arm for movement with the rake arm, a generally flat, gently sloped scum ramp at one position in the circumference of the clarifier, adjacent to the inside of the clarifier wall and to the scum drop out box and sloped upwardly in the direction of movement of the scum wiper, a generally horizontal scum sweeper connected to the scum wiper to sweep scum up the scum ramp, and including a scum drop channel adjacent to an upper end of the scum ramp, and connected to the scum drop out box for receiving scum swept from the scum surface, so that wiped, swept scum drops into the drop channel and exits to the scum drop out box.

2. The wastewater treatment clarifier of claim 1, further including flushing means for flushing collected scum in the drop channel with water, to move the scum out into the scum drop out box.

3. The wastewater treatment clarifier of claim 2, wherein the flushing means includes a flush arm connected to and advancing with the rake arm and the scum wiper, the flush arm being positioned such that once per revolution the flush arm engages and opens a valve at the drop channel, causing clarifier water to flow up into the drop channel to flush the channel.

4. The wastewater treatment clarifier of claim 1, wherein the sweeping launder wiper blade includes a flexible outer section at an outer end of the wiper blade which has a bendable, flexible, rubbery wiper element retained by spring steel bands at an upper end of the wiper element, the spring steel bands tending to return the flexible outer section toward a straight configuration while allowing bending to accommodate any interfering situations as well as imperfections in the shape of the clarifier wall to allow for differences in the distance of the clarifier wall from the sweeping launder wiper as the wiper travels around the clarifier.

5. The wastewater treatment clarifier of claim 4, wherein the flexible outer section includes a plurality of layers of spring steel bands, with the rubbery wiper element between layers.

6. The wastewater treatment clarifier of claim 4, wherein the rubbery wiper element is in two parallel layers, each with slits to allow individual deflection of different pieces of the wiper element.

7. The wastewater treatment clarifier of claim 4, wherein the sweeping launder wiper blade lies substantially in a vertical radial plane relative to the generally circular clarifier.

8. A wastewater treatment clarifier having an effluent launder for withdrawal of effluent from the clarifier, comprising:

the clarifier being essentially circular and having a peripheral clarifier wall, and the launder being connected to the inside of the clarifier wall, the launder being at least partly submerged below the liquid level in the clarifier, the clarifier including a rake arm rotating about a center of the clarifier in a sweeping motion around the clarifier, a scum surface at the clarifier wall at a liquid surface level in the clarifier, above the launder, and scum removal equipment for removing scum from the scum surface and out of the clarifier without interfering with the movement of the sweeping launder wiper, the scum removal equipment including a discharge pipe or conduit extending out through the clarifier wall at a position below the effluent launder, and an internal scum drop out box positioned adjacent to the scum surface and extending down the inside of the clarifier wall to a connection with the scum discharge conduit, and including a scum wiper engaged against the scum surface and movable around the clarifier to sweep scum and connected to the rake arm for movement with the rake arm, a generally flat, gently sloped scum ramp at one position in the circumference of the clarifier, adjacent to the inside of the clarifier wall and to the internal scum drop out box and sloped upwardly in the direction of movement of the scum wiper, a generally horizontal scum sweeper connected to the scum wiper to sweep scum up the scum ramp, and a scum drop channel connected to the internal scum drop out box and adjacent to an upper end of the scum ramp for receiving scum swept from the scum surface and from the scum ramp, so that wiped scum drops into the drop channel, drops down through the internal scum drop out box and is discharged by the scum discharge pipe.

9. The wastewater treatment clarifier of claim 8, wherein the internal scum drop out box extends essentially down through the submerged launder, the launder having upper and lower sides, with vertically aligned openings through the upper and lower sides and the internal scum drop out box passing through the openings and being isolated from the interior of the submerged launder.

10. The wastewater treatment clarifier of claim 9, wherein the clarifier's upper side comprises an obliquely angled plate, and wherein the scum surface comprises an upward vertical integral extension of the obliquely angled plate, except at the opening through the obliquely angled plate.

11. The wastewater treatment clarifier of claim 9, including a sweeping launder wiper having a wiper blade positioned against the clarifier's upper side and connected to the rake arm near an outer end of the rake arm so as to sweep the wiper blade along the clarifier's upper side through full circles of movement around the clarifier so as to sweep settled sludge off the upper side so that the sludge drops to the bottom of the clarifier, and wherein the internal scum drop out box is trapezoidally shaped in cross section, such that the sweeping launder wiper blade initially engages an angled surface as it passes the internal scum drop out box.

12. A wastewater treatment clarifier having an effluent launder for withdrawal of effluent from the clarifier, comprising:

the clarifier being essentially circular and having a peripheral clarifier wall, and the launder being connected to the inside of the clarifier wall, the launder being at least partly submerged below the liquid level in the clarifier, the launder having inlet orifices submerged below the liquid level of the clarifier, the submerged launder comprising an inwardly/downwardly obliquely angled plate connected to the inside of the clarifier wall as an upper side of the launder, a shelf connected to the clarifier wall at a level below the connection of the obliquely angled plate to the wall to form a bottom of the launder, the obliquely angled plate being connected to an inward side of the shelf, and the obliquely angled plate having said inlet orifices to admit effluent water from the clarifier, the clarifier including a rake arm rotating about a center of the clarifier in a sweeping motion around the clarifier, a sweeping launder wiper having a wiper blade positioned against the obliquely angled plate and connected to the rake arm near an outer end of the rake arm so as to sweep the wiper blade along the obliquely angled plate through full circles of movement around the clarifier so as to sweep settled sludge off the obliquely angled plate so that the sludge drops to the bottom of the clarifier, a scum surface at the clarifier wall at a liquid surface level in the clarifier, above the obliquely angled plate of the launder and above the sweeping launder wiper, and scum removal equipment for removing scum from the scum surface and out of the clarifier without interfering with the movement of the sweeping launder wiper, the sweeping launder wiper blade including a flexible outer section at an outer end of the wiper blade which has a bendable, flexible, rubbery wiper element retained by spring steel bands at an upper end of the wiper element, the spring steel bands tending to return the flexible outer section toward a straight configuration while allowing bending to accommodate any interfering structures as well as imperfections in the shape of the clarifier wall to allow for differences in the distance of the clarifier wall from the sweeping launder wiper as the wiper travels around the clarifier.

13. A wastewater treatment clarifier having an effluent launder for withdrawal of effluent from the clarifier, comprising:

the clarifier having a peripheral clarifier wall, and the launder being connected to the inside of the clarifier wall, the launder being at least partly submerged below the liquid level in the clarifier, the clarifier including a rake arm rotating about a center of the clarifier in a sweeping motion around the clarifier, a scum surface at the clarifier wall at a liquid surface level in the clarifier, above the launder, and scum removal equipment for removing scum from the scum surface and out of the clarifier, the scum removal equipment including a scum drop out box secured at the clarifier wall, a scum wiper engaged against the scum surface and movable around the clarifier to sweep scum and connected to the rake arm for movement with the rake arm, a generally flat, gently sloped scum ramp at one position in the circumference of the clarifier, adjacent to the inside of the clarifier wall and to the scum drop out box, a generally horizontal scum sweeper connected to the scum wiper to sweep scum up the scum ramp, and including a scum drop channel connected to the scum drop out box and adjacent to an upper end of the scum ramp, for receiving scum swept from the scum surface, so that wiped, swept scum drops into the scum drop channel and exits to the scum drop out box.

14. The wastewater treatment clarifier of claim 13, wherein the scum removal equipment includes a discharge pipe or conduit extending out the clarifier wall in a position below the effluent launder, and wherein the scum drop out box comprises an internal drop out box positioned adjacent to the scum surface and extending down inside the clarifier to a connection with the scum discharge conduit.

15. The wastewater treatment clarifier of claim 14, wherein the internal scum drop out box extends essentially down through the submerged launder, the launder having upper and lower sides, with vertically aligned openings through the upper and lower sides and the internal scum drop out box passing through the openings and being isolated from the interior of the submerged launder.

16. The wastewater treatment clarifier of claim 13, wherein the scum drop out box is exterior to the clarifier, adjacent to the clarifier wall.

17. The wastewater treatment clarifier of claim 13, wherein the scum removal equipment is secured to and supported by the clarifier wall.

* * * * *